United States Patent [19]
Koseki

[11] Patent Number: 5,641,925
[45] Date of Patent: Jun. 24, 1997

[54] HIGH RESOLUTION KEY SENSOR INCORPORATED IN KEYBOARD MUSICAL INSTRUMENT

[75] Inventor: Shinya Koseki, Shizuoka, Japan

[73] Assignee: Yamaha Corporation, Japan

[21] Appl. No.: 292,092

[22] Filed: Aug. 17, 1994

[30] Foreign Application Priority Data

Aug. 20, 1993 [JP] Japan ................................ 5-228302
Jul. 12, 1994 [JP] Japan ................................ 6-184043

[51] Int. Cl.[6] ........................................... G10G 3/04
[52] U.S. Cl. .................................. 84/462; 84/433
[58] Field of Search ................. 84/433, 462, DIG. 7; 235/145 R

[56] References Cited

U.S. PATENT DOCUMENTS

| 4,307,648 | 12/1981 | Stahnke | 84/462 |
| 4,351,221 | 9/1982 | Starnes et al. | 84/462 |
| 4,913,026 | 4/1990 | Kaneko et al. | 84/462 |

FOREIGN PATENT DOCUMENTS

| 1-115797 | 8/1989 | Japan . |
| 2-59799 | 2/1990 | Japan . |
| 8002886 | 12/1980 | WIPO . |

Primary Examiner—Cassandra C. Spyrou
Attorney, Agent, or Firm—Graham & James LLP

[57] ABSTRACT

A key sensor incorporated in a keyboard musical instrument has a shutter plate attached to a turnable key and photo-interrupters stationary with respect to a key bed, and the shutter plate has an outer bottom edge and an inner bottom edge oblique with respect to a virtual plane where optical paths of the photo-interrupters are extending so that the shutter plate intermittently crosses the optical paths.

14 Claims, 15 Drawing Sheets

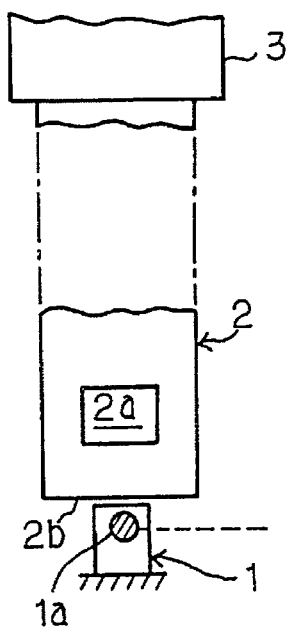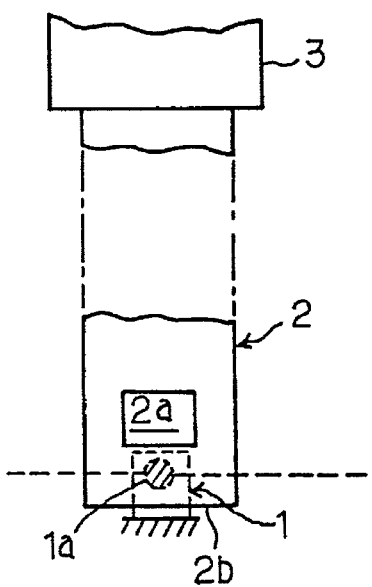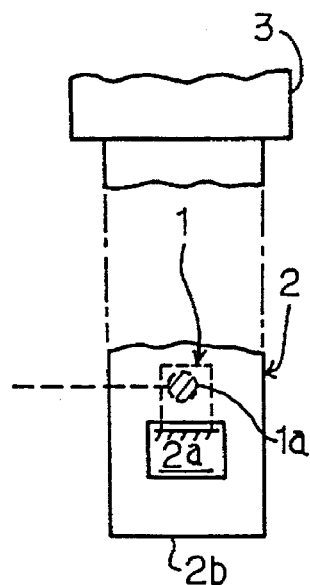
Fig. 1A
PRIOR ART
Fig. 1B
PRIOR ART
Fig. 1C
PRIOR ART

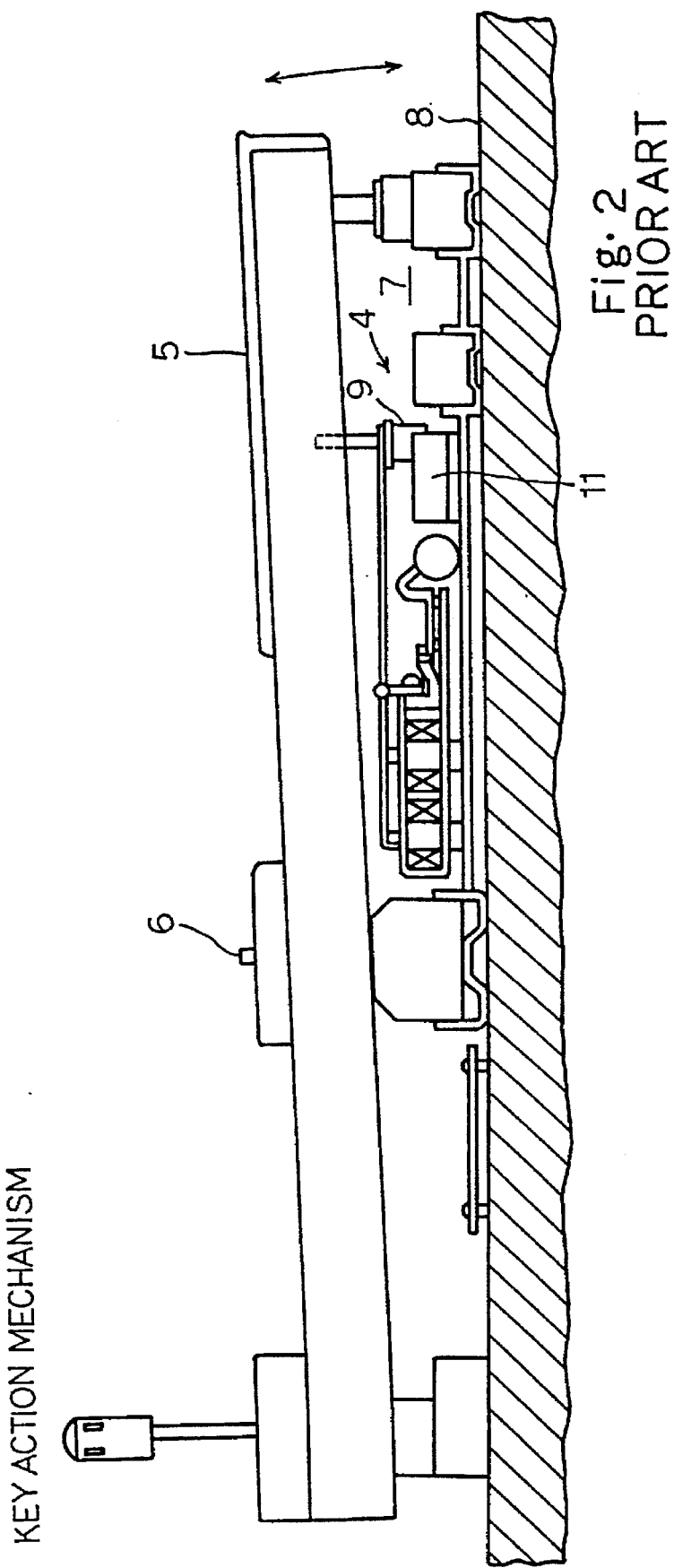

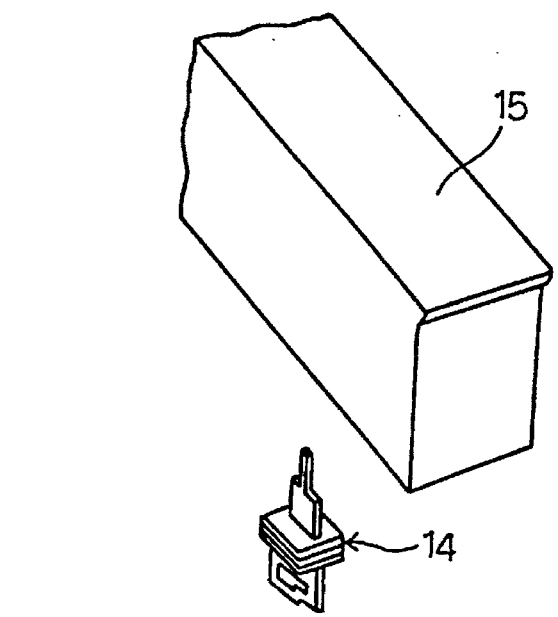
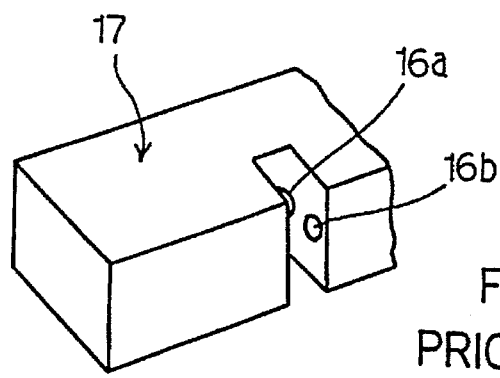
Fig. 6
PRIOR ART
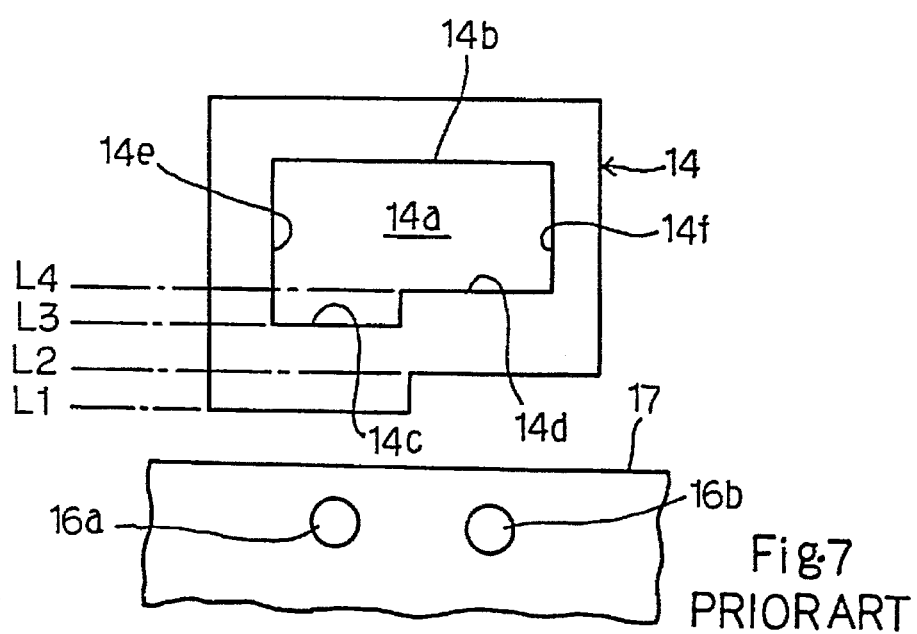
Fig. 7
PRIOR ART

HIGH RESOLUTION KEY SENSOR INCORPORATED IN KEYBOARD MUSICAL INSTRUMENT

FIELD OF THE INVENTION

This invention relates to a key sensor incorporated in a keyboard musical instrument and, more particularly, to a key sensor of a keyboard musical instrument for producing a digital positional signal indicative of a variable key position.

DESCRIPTION OF THE RELATED ART

A typical example of the key sensor is implemented by the combination of a single photo-interrupter 1 and a shutter plate 2 with a single rectangular window 2a as shown in FIGS. 1A to 1C, and the shutter plate 2 is fixed to the lower surface of a key 3 incorporated in a keyboard musical instrument. Therefore, the shutter plate is movable together with the key 3. On the other hand, the photo-interrupter 1 is stationary under the shutter plate 2, and the optical path 1a is twice interrupted by the shutter plate 2 on the way from the rest position of the key 3 to the end position.

In detail, while the key 3 is staying in the rest position, the optical path 1a is below the lower edge 2b of the photo-interrupter 1 as shown in FIG. 1A, and the photo-interrupter 1 converts the photo-energy into electric current. Therefore, the electric signal produced by the photo-interrupter 1 has a high voltage level. The electric signal is transferred to a controller (not shown).

If a player depresses the key 3, the key 3 and, accordingly, the shutter plate 2 are downwardly moved, and the lower portion of the shutter plate 2 interrupts the optical path 1a as shown in FIG. 1B. When the rectangular window 2a reaches the optical path, the photo-interrupter 1 restarts the conversion from the photo-energy to the electric current, and the electric signal goes up to the high voltage level. The photo-interrupter 1 keeps the electric signal in the high voltage level while the rectangular window 2a is transferring the optical path 2a.

Finally, when the key 3 reaches the end position, the upper portion of the shutter plate 2 interrupts the optical path 1a as shown in FIG. 1C, and the electric signal goes down to the low voltage level again.

Thus, the electric signal is changed from the high voltage level through the low voltage level to the high voltage level, and finally goes down to the low voltage level along the downward motion of the key 3. However, the electric signal only indicates the interruption and the non-interruption, and the controller can not discriminate the rest position shown in FIG. 1A from the position allowing the optical path 1a through the rectangular window 2a and the position shown in FIG. 1B from the end position shown in FIG. 1C. In short, the prior art key sensor is low in the resolution.

In order to overcome the problem inherent in the prior art key sensor, a high resolution key sensor is disclosed in Japanese Utility Model Publication of Unexamined Application No. 1-115797 now issued as U.S. Pat. No. 4,913,026. FIG. 2 illustrates the prior art high resolution key sensor 4 assembled with a key 5 incorporated in an automatic player piano. The key 5 is swingable with respect to a balance key pin 6, and the key sensor 4 is provided in a narrow space 7 between the key 5 and a key bed 8. The key sensor 4 is also broken down into a shutter plate 9 attached to the key 5 and two photo-interrupters 10a and 10b embedded into a bracket member 11.

As will be better seen from FIG. 3, a slit 11a is formed in the bracket member 11, and the shutter plate 9 is movable in the slit 11a. The two photo-interrupters 10a and 10b are exposed to the slit 11a, and are arranged in such a manner that optical paths pass through the slit 11a in parallel to each other. In other words, the photo-interrupter 10a is as high as the photo-interrupter 10b with respect to the key bed 8.

On the other hand, two square-shaped windows 9a and 9b are formed in the shutter plate 9, and are slightly offset from one another as shown in FIG. 4. The square-shared windows 9a and 9b are respectively associated with the photo-interrupters 10a and 10b, and the optical paths of the photo-interrupters 10a and 10b momentarily passes through the square-shaped windows 9a and 9b on the way from the rest position to the end position. The photo-interrupters 10a and 10b produces a two-bit electric signal, and the two-bit electric signal is supplied to a controller (not shown). While the key 5 is staying in the rest position, both optical paths are interrupted by the lower portion of the shutter plate 9, and the two bits are in the low voltage level indicative of on-state as shown in Table 1.

TABLE 1

| | Photo-interrupter | |
| Interval | 10a | 10b |
| --- | --- | --- |
| From rest position to L1 | ON | ON |
| From L1 to L2 | ON | OFF |
| From L2 to L3 | OFF | OFF |
| From L3 to end position | OFF | ON |

Assuming now that a player depresses the key 5, the key 5 start a downward motion together with the shutter plate 9, and the lower end L1 of the square-shaped window 9b reaches the optical path of the photo-interrupter 10b. The optical path of the photo-interrupter 10b passes through the square-shaped window 9b, and the associated bit is changed to the high voltage level indicative of off-state. However, the optical path of the photo-interrupter 10a is still interrupted by the lower portion of the shutter plate, and the associated bit is in the low voltage level indicative of the on-state.

Subsequently, the lower end L2 of the square-shaped window 9a reaches optical paths of the photo-interrupter 9a, and the other square-shaped window 9b still allows the other optical path to pass therethrough. As a result, the two bits become in the high level indicative of the off-state.

When the key reaches the end position, the square-shaped window 9a still allows the optical path to pass therethrough. However, the other optical path is interrupted by the upper portion of the shutter plate 9, and the two bits are indicative of the off-state and the on-state, respectively. Thus, the two-bit electric signal bits has four different bit patterns, and the resolution of the prior art key sensor is higher than the prior art key sensor shown in FIGS. 1A to 1C.

Another prior art key sensor is disclosed in U.S. Pat. No. 4,351,221, and is illustrated in FIG. 5 of the drawings. The prior art key sensor is also implemented by the combination of two photo-interrupters 12a and 12b and a shutter plate 13. A notch 13a and a cutout 13b are formed in the peripheral portion of the shutter plate 13, and are associated with the photo-interrupters 12a and 12b, respectively.

When the shutter plate is downwardly moved, the shutter plate 13 selectively interrupts and releases the optical paths of the photo-interrupters 12a and 12b depending upon the position thereof.

Yet another prior art key sensor is disclosed in Japanese Patent Publication of Unexamined Application No. 2-59799, and FIGS. 6 and 7 illustrates the prior art key sensor. The prior art key sensor comprises a shutter plate 14 attached to a key 15 and two photo-interrupters 16a and 16b embedded into a bracket member 17. The photo-interrupters 16a and 16b is laterally spaced, and are positioned at the same height from a key bed (not shown). A window 14a is formed in the shutter plate 14, and the left portion of the window 14a is wider than the right portion of the window 14a. However, the upper end 14b of the window 14a is in parallel to the lower ends 14c and 14d, and the side ends 14e and 14f are vertical to the upper and lower ends 14a to 14c. The left portion and the right portion of the window 14a are respectively assigned the photo-interrupters 16a and 16b, and cross the optical paths of the photo-interrupters 16a and 16b on the way from the rest position to the end position.

The photo-interrupters 16a and 16b produce two-bit electric signal, and sequentially change the bit patterns in the downward motion as shown in Table 2.

TABLE 2

| Interval | Photo-interrupter | |
|---|---|---|
| | 16a | 16b |
| From rest position to L1 | OFF | OFF |
| From L1 to L2 | ON | OFF |
| From L2 to L3 | ON | ON |
| From L3 to L4 | OFF | ON |
| From L4 to end position | OFF | OFF |

While the key 15 is staying in the rest position, the lower edge L1 of the shutter plate 14 is over the optical paths as shown in FIG. 7, and the photo-interrupters 16a and 16b keep the bits in the high voltage level indicative of the off-state. The edges L1, L2, L3 and L4 sequentially pass through the optical paths of the photo-interrupters 16a and 16b, and the bit pattern of the electric signal is changed as shown in Table 2. Finally, when the key 15 reaches the end position, the optical paths pass through the left and right portions of the window 14a, and both bits are indicative of the off-state again. Although Table 2 contains five rows, the two-bit electric signal forms only four different bit patterns.

However, a problem is encountered in the prior art high resolution key sensors in that the two-bit electric signal does not change the bit pattern as shown in Tables 1 and 2.

SUMMARY OF THE INVENTION

It is therefore an important object of the present invention to provide a key sensor which exactly changes the bit pattern.

The present inventor contemplated the problem inherent in the prior art high resolution key sensors, and noticed that the tolerance between each optical path and the associated part of the window/notch/cutout was too small to assemble them with different parts, i.e., the key and the bracket. For example, the optical paths of the photo-interrupters 10a and 10b had to be respectively regulated to the widths of the windows 9a and 9b, and the optical paths of the photo-interrupters 16a/16b had to be respectively regulated to the width of the left portion and the width of the right portion. On the other hand, while the shutter plate and the photo-interrupters were assembled with the key and the bracket member, errors were unavoidable, and each tolerance was too small to take up the errors. The present inventor concluded that the total tolerance be shared between the two photo-interrupters.

To accomplish the object, the present invention proposes to form an edge of a shutter plate continuously varying a distance from a virtual plane where a plurality of optical paths extend.

In accordance with the present invention, there is provided a key sensor incorporated in a keyboard musical instrument and associated with a key turnable between a rest position and an end position with respect to a board member, comprising: a) a plurality of sets of photo-radiating elements and photo-electric converting elements stationary with respect to the board member, and having respective optical paths extending on a virtual plane between the photo-radiating elements and the associated photo-electric converting elements; and b) a shutter plate attached to the key, and having a plurality of edges defining a configuration thereof, at least one of the plurality of edges being continuous and intermittently crossing the optical paths while the key is traveling from the rest position to the end position, the aforesaid at least one of the plurality of edges being varied in a distance from the virtual plane.

BRIEF DESCRIPTION OF THE DRAWINGS

The features and advantages of the key sensor according to the present invention will be more clearly understood from the following description taken in conjunction with the accompanying drawings in which:

FIGS. 1A, 1B and 1C are front views showing the prior art key sensor changing the relative position between the shutter plate and the photo-interrupter;

FIG. 2 is a side view showing the key provided with the prior art high resolution key sensor;

FIG. 6 is a perspective view showing yet another prior art high resolution key sensor in disassembled state;

FIG. 7 is a perspective view showing the shutter plate and the photo-interrupters forming in combination the prior art high resolution key sensor;

DESCRIPTION OF THE PREFERRED EMBODIMENTS

First Embodiment

Figure 3:
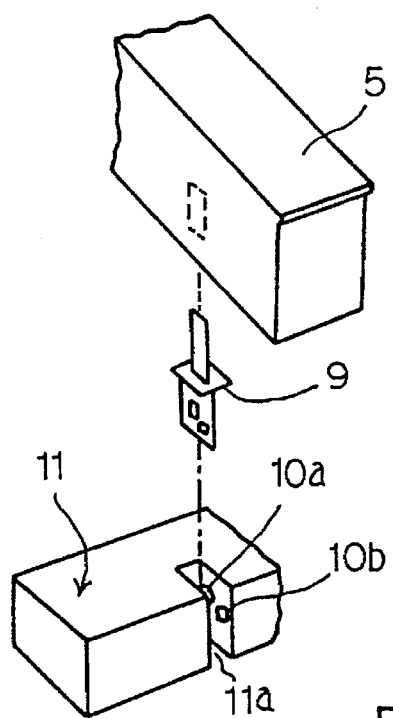
FIG. 3 is a perspective view showing the prior art high resolution key sensor in disassembled state.
Figure 4:
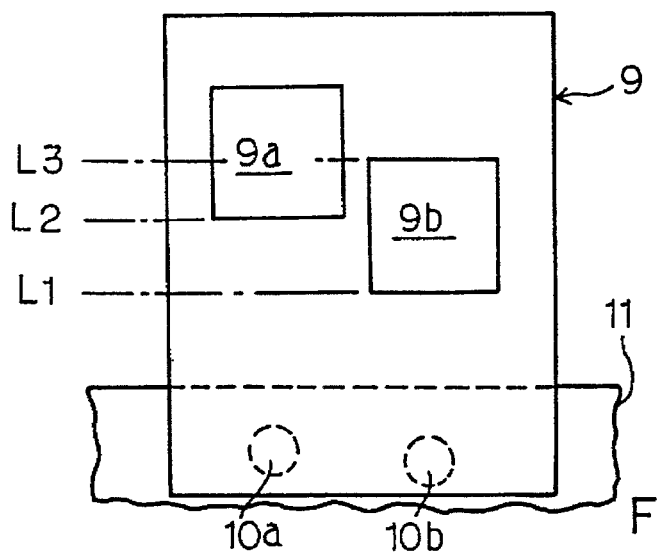
FIG. 4 is a front view showing the relative position between the shutter plate and the photo-interrupter forming in combination the prior art high resolution key sensor.
Figure 5:
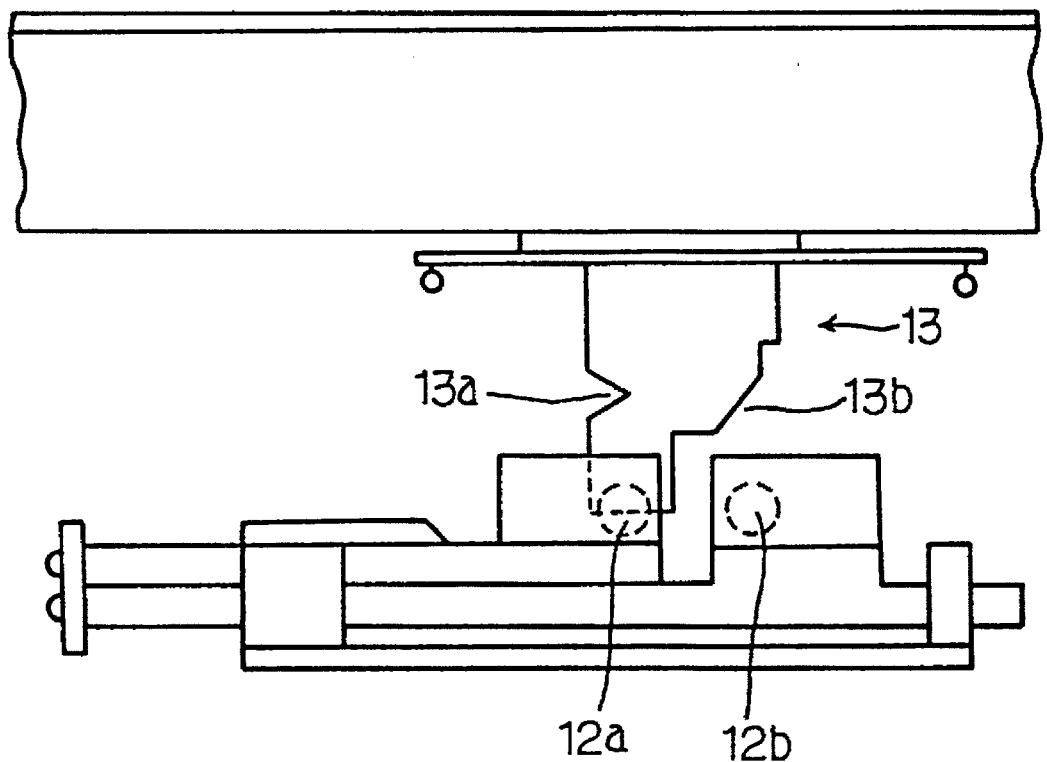
FIG. 5 is a front view showing another prior art high resolution key sensor.
Figure 8:
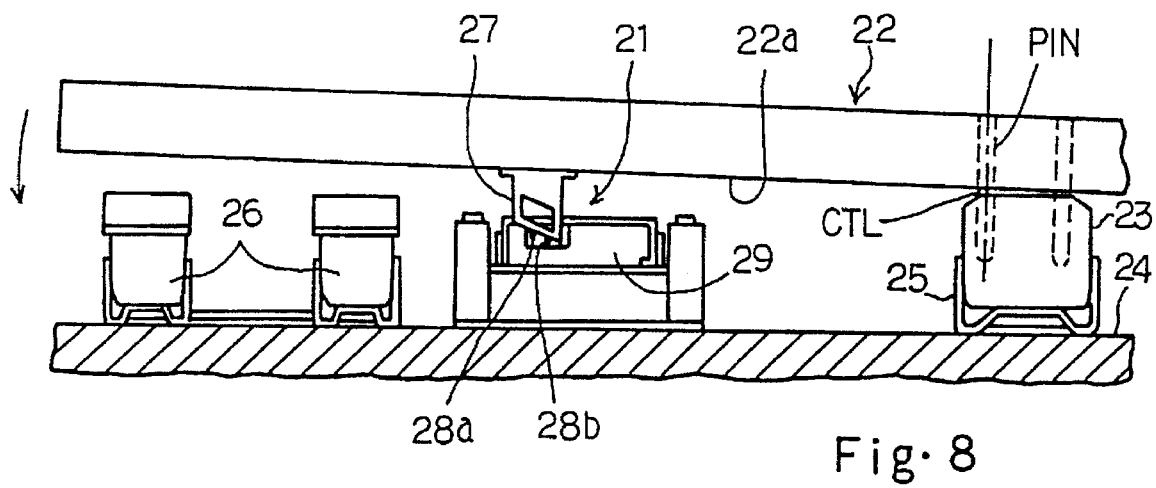
FIG. 8 is a side view showing a key equipped with a key sensor according to the present invention.

Referring to FIG. 8 of the drawings, a key sensor 21 embodying the present invention is provided in association with a key 22. The key 22 forms a part of a keyboard which in turn forms a part of a keyboard musical instrument such as, for example, an electronic keyboard instrument, an automatic player piano or a composite musical instrument disclosed in Japanese Patent Application No. 4-174813. U.S. patent application Ser. No. 08/073,092, European Patent Application No. 93109211.8, Korean Patent Application No. 93-13003 and Taiwanese Patent Application 82105903 were filed on the basis of the Japanese Patent Application.

The key 22 is turnable around a contact point CTL between a balance pin PIN projecting from a balance rail 23, and the balance rail 23 is mounted on a key bed 24 by means of a key frame 25. While a force is not exerted on an upper surface of the key 22, the key 22 is staying in a rest position, and maximizes a distance between the key bed 24 and the lower surface 22a thereof. If a player depresses the key 22, the key 22 starts an angular motion from the rest position to an end position, and the distance is continuously decreased. When the key 22 finishes the travel, the key 22 reaches the end position, and the distance is minimized. Thus, the key 22 is movable with respect to the stationary key bed 24.

Though not shown in FIG. 8, an actuator unit is provided for the key 22, and actuates the key 22 from the rest position to the end position instead of the player. The actuator may be a solenoid-operated actuator responsive to an electric driving signal supplied from a controller (not shown).

The key sensor 21 is provided in a narrow space under the lower surface 22a of the key 22 between the balance rail 23 and a pair of front rails 26, and monitors the key 22 for producing a multi-bit electric signal indicative of a variable position of the key 26. The multi-bit electric signal is supplied from the key sensor 21 to the controller (not shown), and reports the motion of the key 22 during a performance by a player. Other key sensors (not shown) are respectively associated with the other keys, and report the respective motions of the other keys. If the key sensors are incorporated in an automatic player piano, the motions of the keys are memorized in the controller, and the associated actuator units reproduce the music performed by the player. On the other hand, if the key sensors are provided in the composite keyboard musical instrument, the controller produces electronic signals indicative of the vibrations of music wires associated with the depressed keys, and the electronic signals are converted into an audio signal for producing sounds through a headphone or a speaker system.

The key sensor 21 comprises a shutter plate 27 and a plurality of photo-interrupters 28a and 28b. The shutter plate 27 is attached to the lower surface 22a of the key 22, and is, accordingly, movable together with the key 22. On the other hand, the plurality of photo-interrupters 28a and 28b are embedded in a case member 29, and are stationary with respect to the key bed 24.

The photo-emitting element and a photo-detecting element form in combination each photo-interrupter 28a/28b. The photo-emitting elements are spaced apart from the associated photo-detecting elements, and the shutter plate 27 is movable in the gap between the photo-emitting elements and the photo-detecting elements. The photo-emitting element produces a light beam from electric current, and radiates to the associated photo-detecting element. The photo-detecting elements convert the light beams into electric current, and produce the multi-bit electric signals. Appropriate semiconductor optical devices are available for the photo-emitting elements and the photo-detecting elements, and the light beams serve as optical paths, respectively.

Figure 9:
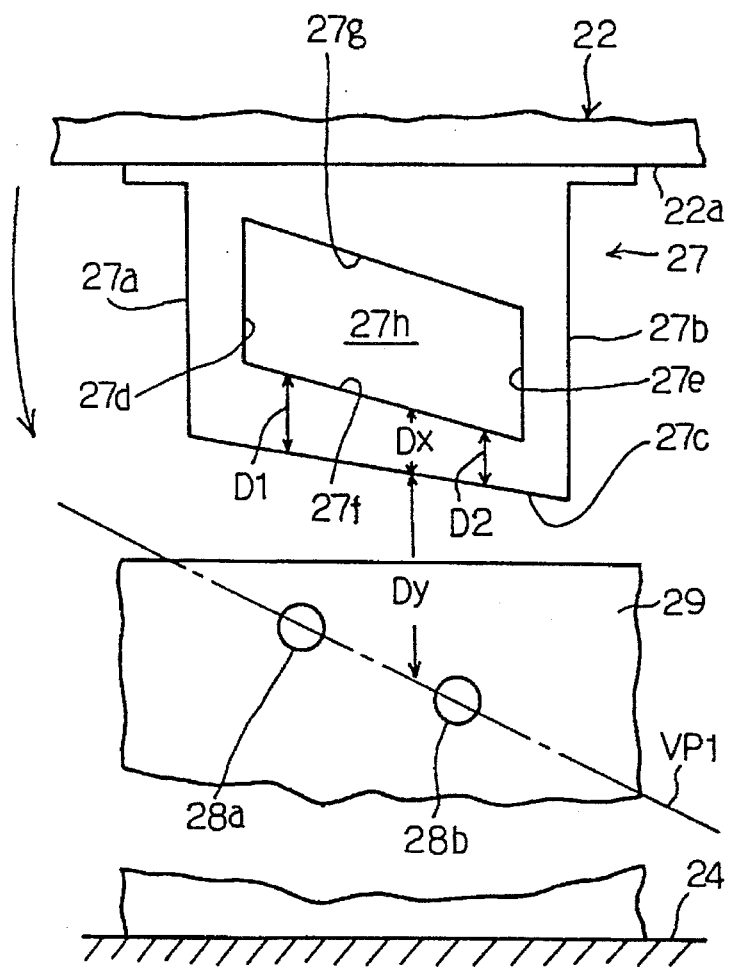
FIG. 9 is a front view showing the key sensor in a large scale.

Turning to FIG. 9 of the drawings, the shutter plate 27 has outer side edges 27a and 27b in parallel to each other, an outer bottom edge 27c oblique to the lower surface 22a of the key 22, inner side edges 27d and 27e in parallel to each other, an inner bottom edge 27f oblique to the lower surface 22a and an inner upper edge 27g also oblique to the lower surface 22a. The inner edges 27f and 27g are larger in angle to the lower surface 22a than the outer bottom edge 27c, and the inner upper edge 27g is larger in angle to the lower surface 22a than the inner bottom edge 27f. As a result, the distance Dx between the inner bottom edge 27f and the outer bottom edge 27c is decreased from the left side to the right side, and the distance D1 is, by way of example, larger than the distance D2. This is because of the fact that the photo-interrupters 28a and 28b are differently spaced apart from the contact point CTL, and a point on the left side is expected to move along an arc longer than an arc for a point on the right side. In order to cancel the differences between the arcs, the distance Dx is decreased from the left side to the right side. The reason why the inner upper edge 27g is larger in angle to the lower surface 22a than the inner bottom edge 27f is similar to the difference in distance between the inner bottom edge 27f and the outer bottom edge 27c.

The inner edges 27d, 27e, 27f and 27g define a window 27h, and the window 27h is shared between the photo-interrupters 28a and 28b. In other words, the window 27h is wider than the lateral distance between the photo-interrupters 28a and 28b.

The photo-interrupter 28a is spaced apart from the photo-interrupter 28b not only in the lateral direction but also the vertical direction, and the photo-interrupters 28a and 28b are coplanar with a virtual plane VP1. However, the arrangement of the photo-interrupters 28a and 28b allows the light beams to pass through the window 27h. The distance between the outer bottom edge 27c and the virtual plane VP1 is increased from the left side to the right side. As a result, while the shutter plate 22 is traveling from the rest position to the end position, the outer bottom edge 27c interrupts the light beam of the photo-interrupter 28a earlier than the light beam of the photo-interrupter 28b, and escapes from the lower portion of the shutter plate 22 to the window 27h also earlier than the light beam of the photo-interrupter 28b.

Figure 10:
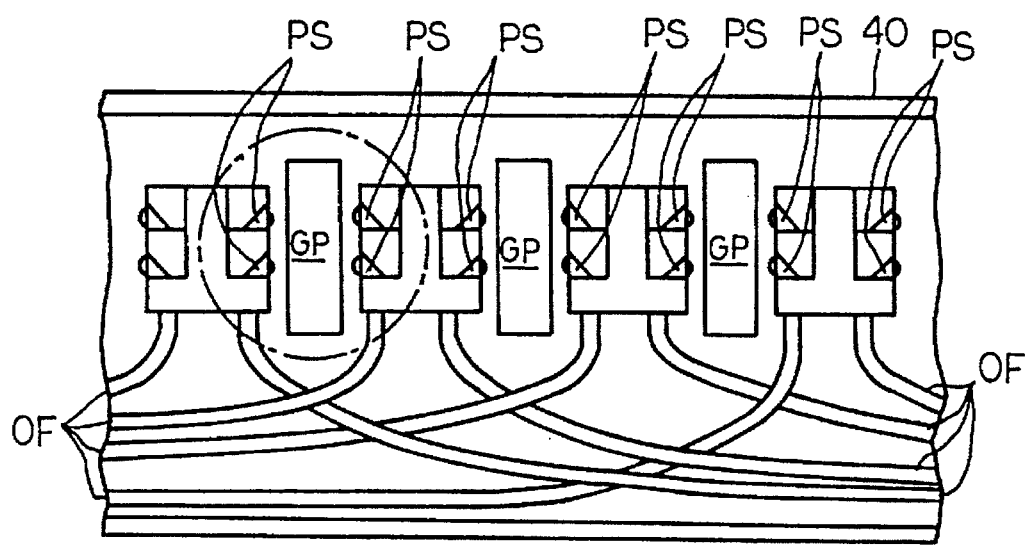
FIG. 10 is a bottom view showing a modification of an optical system incorporated in the key sensor according to the present invention.
Figure 11:
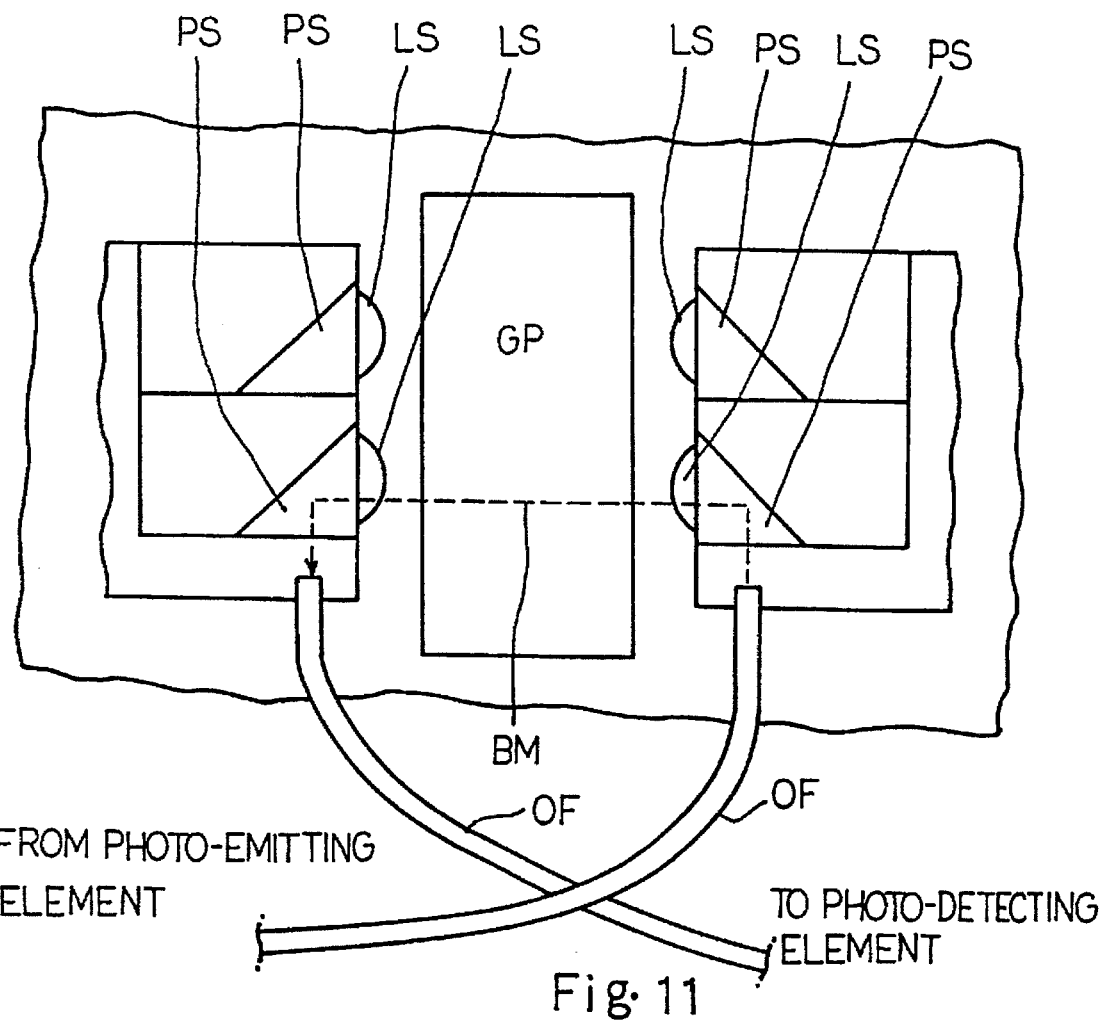
FIG. 11 is a view showing in detail a pair of prisms encircled in a dot-and-dash line in FIG. 10.

In the embodiment described hereinbefore, the photo-emitting elements are directly opposed to the associated photo-detecting elements, and form parts of a direct optical system. However, the photo-emitting elements may be indirectly opposed to the photo-detecting elements through optical fibers OF, miniature lens units LS and prisms PS as shown in FIGS. 10 and 11. Each pair of prisms PS assembled with the miniature lens units LS is provided for one of the photo-interrupters 28a and 28b, and the miniature lens units LS of each pair are opposed to each other across a gap GP formed in a case member 40. Though not shown in FIGS. 10 and 11, a photo-emitting element is coupled to one of the optical fibers OF paired with one another, and the other of the optical fibers OF is coupled to a photo-detecting element. Therefore, a light beam BM produced by the photo-emitting element is radiated from the miniature lens unit LS, and travels across the gap GP. The light beam BM is transferred from the miniature lens unit LS through the prism PS and the optical fiber OF to the photo-detecting element.

The indirect optical system shown in FIGS. 10 and 11 is desirable for an extremely narrow space between the lower surfaces 22a of the keys 22 and the key bed 24, because the compact case 40 is expected to accommodate the miniature lens LS and the prisms PS.

If the controller sequentially energizes the photo-emitting elements in a time division multiplex, the indirect optical system becomes simpler.

In operation, while the key 22 is staying in the rest position, the outer bottom edge 27c of the shutter plate 22 is over the virtual line VP1 as shown in FIGS. 8 and 9, and the photo-interrupters 28a and 28b produces the outputs of a high level indicative of off-state.

Figure 12A:
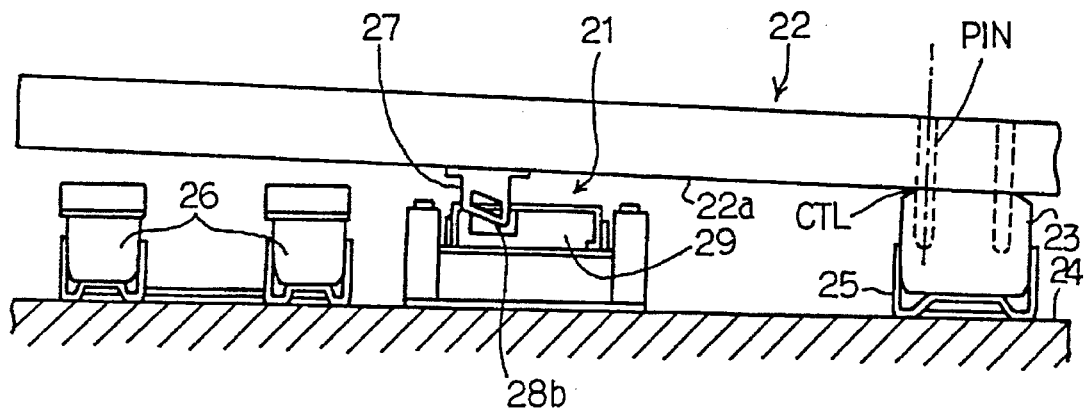
FIGS. 12A, 12B, 12C and 12D are side views showing variation of the relative position between the shutter plate and the photo-interrupters when the key is depressed.

If the key 22 is depressed, the key 22 and the shutter plate 27 start the angular motion from the rest position toward the end position, and the left side of the shutter plate 27 reaches the virtual plane VP1. However, the right side of the shutter plate 27 is still over the virtual plane VP1. As a result, the light beam of the photo-interrupter 28a is interrupted by the left portion of the shutter plate 27, and the other light beam is still transferred from the photo-emitting element to the photo-detecting element. The photo-interrupter 28a produces the output of a low level indicative of on-state, and the other photo-interrupter 28b still produces the output of the high level. The relative position between the shutter plate 27 and the photo-interrupters 28a and 28b is illustrated in FIG. 12A, and is referred to as "Position I" abbreviated as "P1" in Table 3.

Figure 12B:
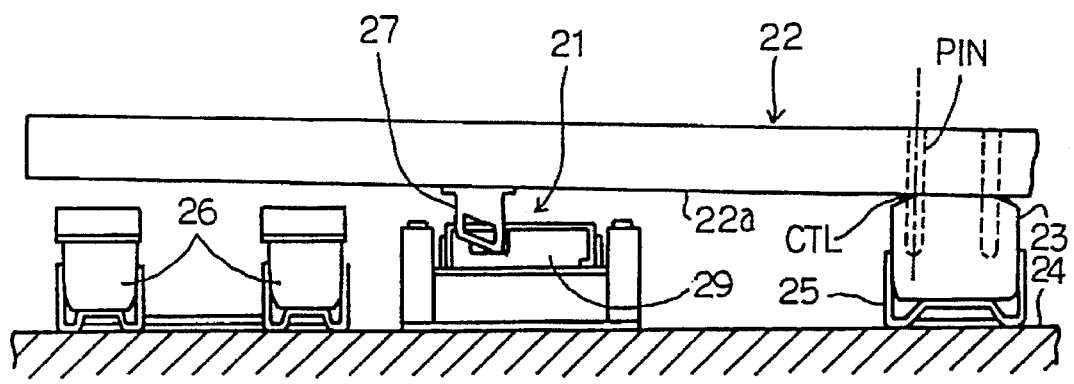

If the key 22 further turns around the contact point CTL in the counter-clockwise direction, both beams are interrupted by the lower portion of the shutter plate 27 as shown in FIG. 12B, and the both photo-interrupters 28a and 28b produces the outputs of the low level indicative of the on-state. The relative position between the shutter plate 27 and the photo-interrupters 28a and 28b is referred to as "Position II" abbreviated as "P2" in Table 3.

Figure 12C:
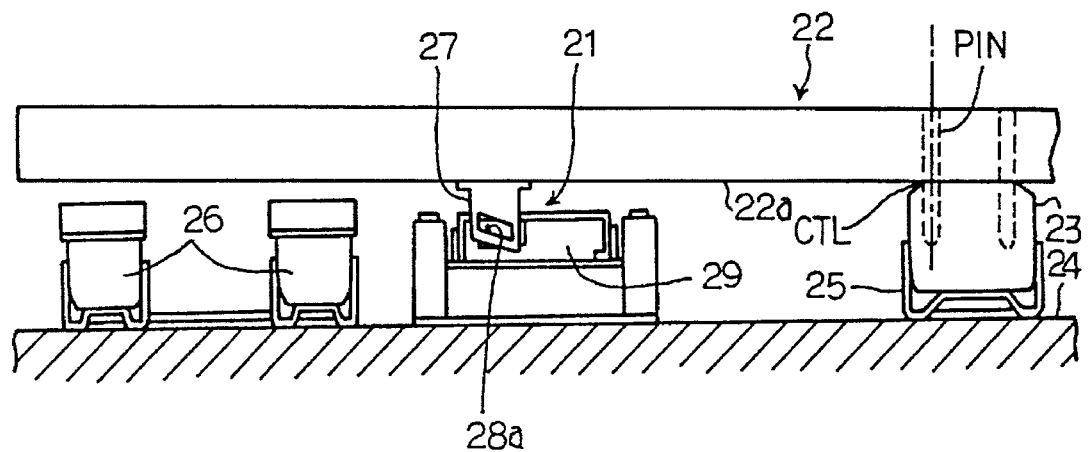

If the key 22 further turns around the contact point CTL in the counter-clockwise direction, the beam of the photo-interrupter 28a is transferred through the window 27h, and the other beam is still interrupted by the lower portion of the shutter plate 27 as shown in FIG. 12C. Then, the photo-interrupter 28a produces the output of the high level indicative of the off-state, and the other photo-interrupter 28b produces the output of the low level indicative of the on-state. The relative relation between the shutter plate 27 and the photo-interrupters 28a and 28b is referred to as "Position III" abbreviated as "P3" in Table 3.

Figure 12D:
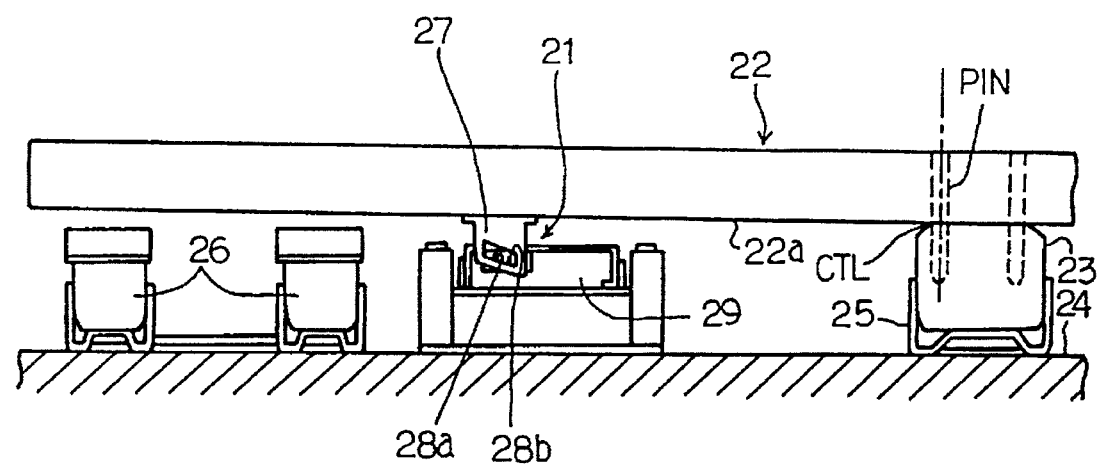

If the key 22 further turns in the counter clockwise direction, the window 27h transfers both light beams from the photo-emitting elements to the photo-detecting elements as shown in FIG. 12D, and photo-interrupters 28a and 28b produces the outputs to the high level indicative of the off-state. The relative position is referred to as "Position IV" abbreviated as "P4" in Table 4, and the key sensor 21 allows the window 27h to transfer from the photo-emitting elements to the photo-detecting elements until the key 22 reaches the end position. The variation of the relative position is summarized in Table 3.

TABLE 3

| Interval | Photo-interrupter | |
|---|---|---|
| | 28a | 28b |
| From rest position before P1 | OFF | OFF |
| From P1 before P2 | ON | OFF |
| From P2 before P3 | ON | ON |
| From P3 before P4 | OFF | ON |
| From P4 to end position | OFF | OFF |

Thus, the simple linear outer bottom edge 27c intermittently crosses the light beams of the photo-interrupters 28a and 28b, and the multi-bit electric signal exactly indicates the variable key position.

As described hereinbefore, the multi-bit electric signal is supplied to the controller (not shown), and the controller determines the locus of the associated key 22.

Figure 13:
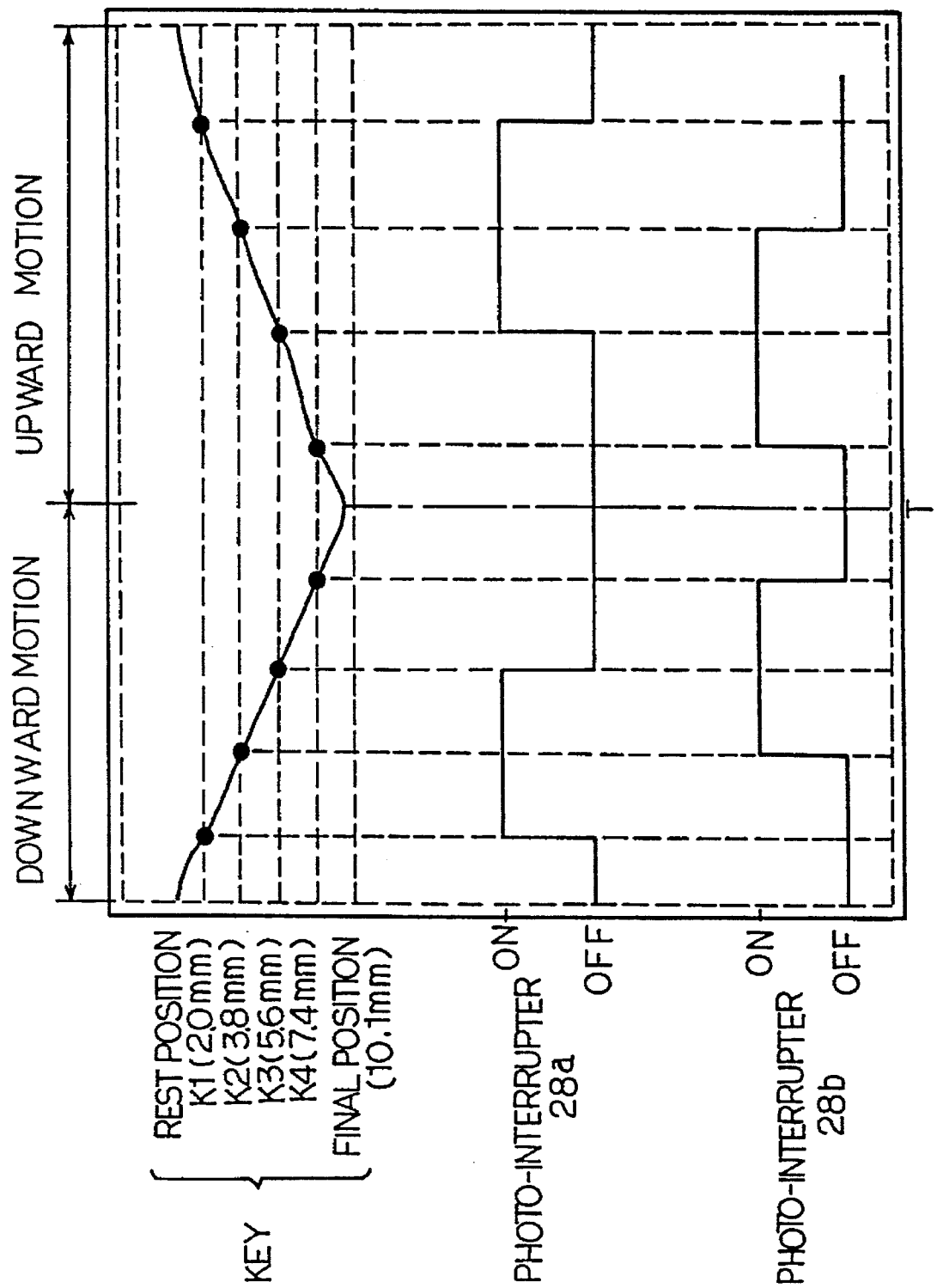
FIG. 13 is a graph showing relation between a locus of a key and the variation of bit pattern of a multi-bit electric signal produced by the key sensor according to the present invention.

FIG. 13 shows relation between the locus of the key 22 and the multi-bit electric signal. If the key 22 reciprocates from the rest position through points K1 to K4 to the final position, the multi-bit electric signal varies the bit pattern as shown, and a sound is generated at timing T.

The controller calculates the key velocity between each section between K1 to K2, K2 to K3, K3 to K4, and estimates the timing T on the basis of the key velocity in each section. The controller sequentially compares the estimated timing T with the next estimated timing T, and determines the earliest timing T. The earliest timing T is used for the timing for the tone generation. If the key velocity in the section between K3 and K4 is the largest, the estimated timing T on the basis of the key velocity in the section between K3 and K4 is determined to be the timing for the tone generation. However, if the key velocity in the section between K1 and K2 is the largest, the estimated timing T on the basis of the key velocity in the section between K1 and K2 is available for the timing for the tone generation.

When a player depresses a key in a different touch such as, for example, a deep pianissimo, a shallow repetition or staccato, the associated hammer impacts at different timings. The controller estimates not only the hammer velocity at the impact but also the timing of the tone generation on the basis of the locus of the key 22.

If the keyboard musical instrument is the automatic player piano, the controller produces data indicative of the loudness and the timing for the tone generation, and the data are stored in a memory system. On the other hand, if the keyboard musical instrument is the composite keyboard musical instrument, the controller regulates the loudness to the estimated value, and causes the headphone or the speaker system to produce the sound at the estimated timing.

In an assembling work, a worker fixes installs the photo-interrupters 28a and 28b independently of the shutter plate 27 attached to the lower surface 22a. Therefore, the relative position between the shutter plate 27 and the photo-interrupters 28a and 28b may be undesirably offset from a standard position. However, the outer bottom edge 27c, the inner bottom edge 27e and the inner upper edge 27g are continuous, and any point on each edge is available for the photo-interrupters 28a and 28b. In other words, the continuous edges of the shutter plate 27 are shared between the photo-interrupters 28a and 28b, and the offset from the standard position is taken up by the tolerance of the window 27h.

Moreover, even if the case member 29 is mistakenly offset from the standard position in the longitudinal direction of the key 22, the oblique edges 27c, 27f and 27g cross the optical paths at right intervals as those without an offset, and the oblique edges 27c, 27f and 27g designed under a standard radius of gyration absorbs the mistake in the installation of the case member 29 on the key bed 24.

Although the angles of the edges 27f and 27g are only arranged in such a manner as to cancel the difference in arc due to the turning motion of the key-22, the edges 27f and 27g may further regulate so as to adjusting the timings for crossing the optical paths. Moreover, the edges 27c, 27f and 27g may be formed by non-linear lines.

Second Embodiment

Figure 14:
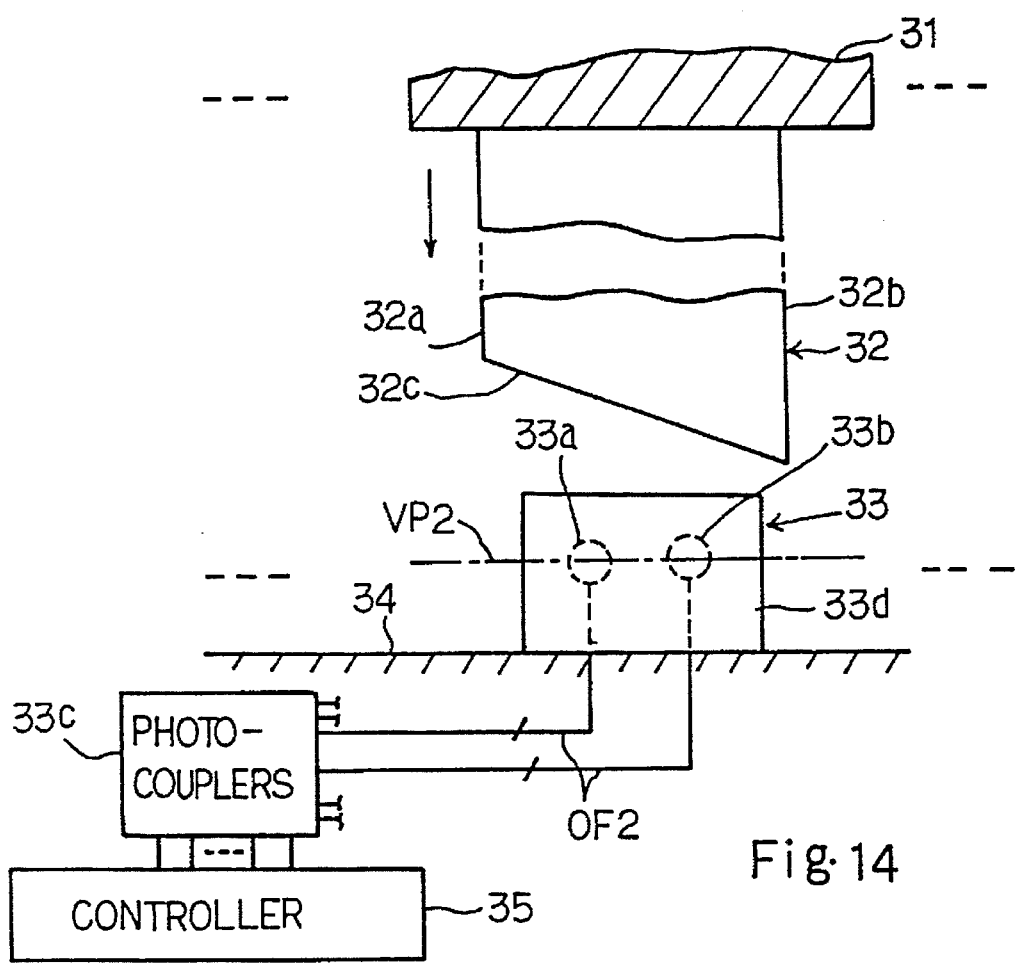
FIG. 14 is a front view showing another key sensor according to the present invention.

Turning to FIG. 14 of the drawings, another key sensor embodying the present invention is associated with one of the keys 31 forming a part of a keyboard, and the keyboard is incorporated in a keyboard musical instrument. The keyboard instrument may be an electronic keyboard, an automatic player piano or the composite keyboard musical instrument described in conjunction with the first embodiment.

The key sensor is implemented by the combination of a shutter plate 32 and an indirect optical detecting system 33. The shutter plate 32 is attached to a lower surface of the key 31, and is, accordingly, movable together with the key 31. The shutter plate 32 has side edges 32a and 32b in parallel to each other and a bottom edge 32c oblique to a virtual plane VP2 described hereinbelow. However, a window is not formed in the shutter plate 32.

On the other hand, the indirect optical system 33 is similar to that shown in FIGS. 10 and 11. A pair of light beams 33a and 33b is radiated in parallel over a gap between miniature lens units, are extending on the virtual plane VP2. The light beams 33a and 33b are transferred through optical fibers OF2 between the miniature lens units and one of photo-couplers 33c. The miniature lens units and the associated prisms are supported by a case member 33d, and the case member 33d is mounted on a stationary board member 34 such as, for example, a key bed. The key 31 is moved toward the stationary board member 34, and is left therefrom. For this reason, the virtual plane VP2 and, accordingly, the light beams 33a and 33b are stationary with respect to the stationary board member 34, and the key 31 and the shutter plate 32 are movable with respect to the stationary board member 34.

The photo-couplers 33c are coupled to a controller 35 through signal wirings, and each photo-coupler 33c supplies a two-bit electric signal to the controller for reporting the relative position between the shutter plate 32 and the virtual plane VP2.

In operation, while the key 31 is staying in the rest position, the light beams 33a and 33b are not interrupted, and the associated photo-couplers 33c supply the two-bit electric signal indicative of the off-state. If the key 31 starts a downward motion, the light beam 33b is firstly interrupted by the right portion of the shutter plate 32, and the photo-coupler associated with the light beam 33b changes the output to the low level indicative of the on-state. However, the other light beam 33a is not interrupted, and the output of the associated photo-coupler is maintained in the high level indicative of the off-state.

If the key 31 further advances the shutter plate 32, both light beams 33a and 33b are interrupted by the shutter plate 32, and the associated photo-couplers supply the outputs of the low level indicative of the on-state. While the key 31 is returning from the end position to the rest position, the two-bit electric signal changes the bit pattern in the opposite direction to the downward motion.

In an assembling work for the keyboard instrument, even if the shutter plate 32 is offset from a standard position and is, accordingly, mis-aligned with the light beams 33a/33b, the photo-couplers correctly change the bit pattern, because the shared edge line 32c sequentially interrupts the light beams 33a and 33b.

Figure 15:
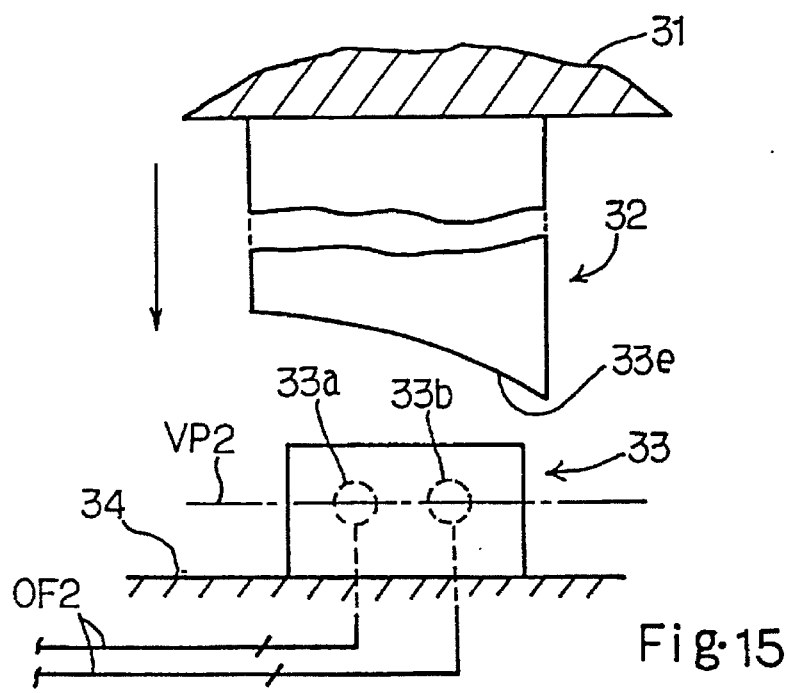
FIG. 15 is a front view showing a modification of the key sensor shown in FIG. 14.

The oblique straight line forms the bottom edge 32c of the shutter plate 32 in the second embodiment. However, the bottom edge of the shutter plate 32 may be formed by a non-linear line 33e in so far as the non-linear line does not have an abrupt discontinuity and an inflection point as shown in FIG. 15, because the abrupt discontinuity and the inflection point do not allow a plurality of photo-interrupters to share the non-linear edge line.

Third Embodiment

Figure 16:
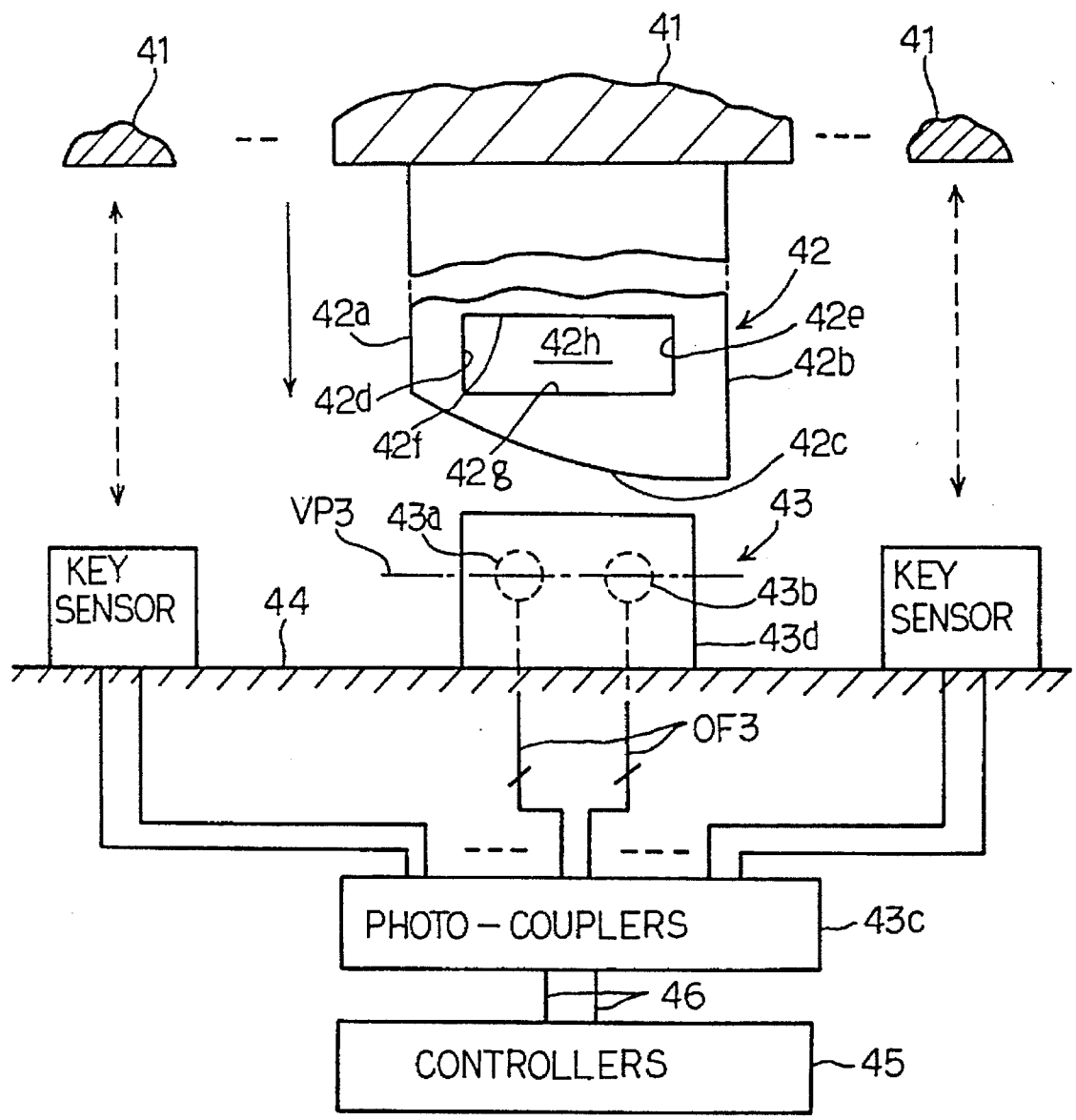
FIG. 16 is a front view showing yet another key sensor according to the present invention.

Turning to FIG. 16 of the drawings, yet another key sensor is provided for a keyboard implemented by a plurality of turnable keys 41. The keyboard forms a part of a keyboard musical instrument as similar to the first embodiment.

The key sensor is implemented by the combination of a shutter plate 42 and an indirect optical detecting system 43. The shutter plate 42 is attached to a lower surface of the key 41, and is, accordingly, movable together therewith. The shutter plate 42 has outer side edges 42a and 42b in parallel to each other, an outer bottom edge 42c not in parallel to a virtual plane VP3, inner side edges 42e and 42f in parallel to each other, an inner upper edge 42f and an inner bottom edge 42g. The inner edges 42d, 42e, 42f and 42g define a window 42h in the shutter plate 42, and the outer bottom edge 42c is formed by a non-linear line without an abrupt discontinuity and an inflection point. For this reason, the distant between the outer bottom edge 42c and the virtual plane VP3 is varied from the left side to the right side.

On the other hand, the indirect optical system 43 is similar to that shown in FIGS. 10 and 11. A pair of light beams 43a and 43b is radiated in parallel over a gap between miniature lens units, are extending on the virtual plane VP3. The light beams 43a and 43b are transferred through optical fibers OF3 between the miniature lens units and one of photo-couplers 43c. The miniature lens units and the associated prisms are supported by a case member 43d, and the case member 43d is mounted on a stationary board member 44 such as, for example, a key bed. The key 41 is moved toward the stationary board member 44, and is left therefrom. For this reason, the virtual plane VP3 and, accordingly, the light beams 43a and 43b are stationary with respect to the stationary board member 44, and the key 41 and the shutter plate 42 are movable with respect to the stationary board member 44.

The photo-couplers 43c are coupled to a controller 45 through a pair of signal wirings, and the photo-couplers 33c sequentially communicate with the controller in a time division multiplexing fashion for supplying two-bit electric signals.

In operation, while the key 41 is staying in the rest position, the light beams 43a and 43b are not interrupted, and the associated photo-couplers 43c supply the two-bit electric signal indicative of the off-state. If the key 41 starts a downward motion, the light beam 43b is firstly interrupted by the right portion of the shutter plate 42, and the photo-coupler associated with the light beam 43b changes the output to the low level indicative of the on-state. However, the other light beam 43a is not interrupted, and the output of the associated photo-coupler is maintained in the high level indicative of the off-state.

If the key 41 further advances the shutter plate 42, both light beams 43a and 43b are interrupted by the shutter plate 42, and the associated photo-couplers supply the outputs of the low level indicative of the on-state.

When the key 41 reaches the end position, the window 42h allows the light beams 43a and 43b to pass therethrough, and the photo-couplers changes the outputs to the high level indicative of the off-state again.

While the key 41 is returning from the end position to the rest position, the two-bit electric signal changes the bit patter in the opposite direction to the downward motion.

In an assembling work for the keyboard instrument, even if the shutter plate 42 is offset from a standard position and is, accordingly, mis-aligned with the light beams 43a/43b, the photo-couplers correctly change the bit pattern, because the shared edge line 42c sequentially interrupts the light beams 43a and 43b.

If the inner bottom edge 42g is oblique to the virtual plane VP3, the light beam 43b is firstly exposed to the window 42h, and, thereafter, both light beams 43a and 43b are exposed to the window 42h during a downward motion of the key 41. As a result, the resolution is enhanced.

Fourth Embodiment

Figure 17A:
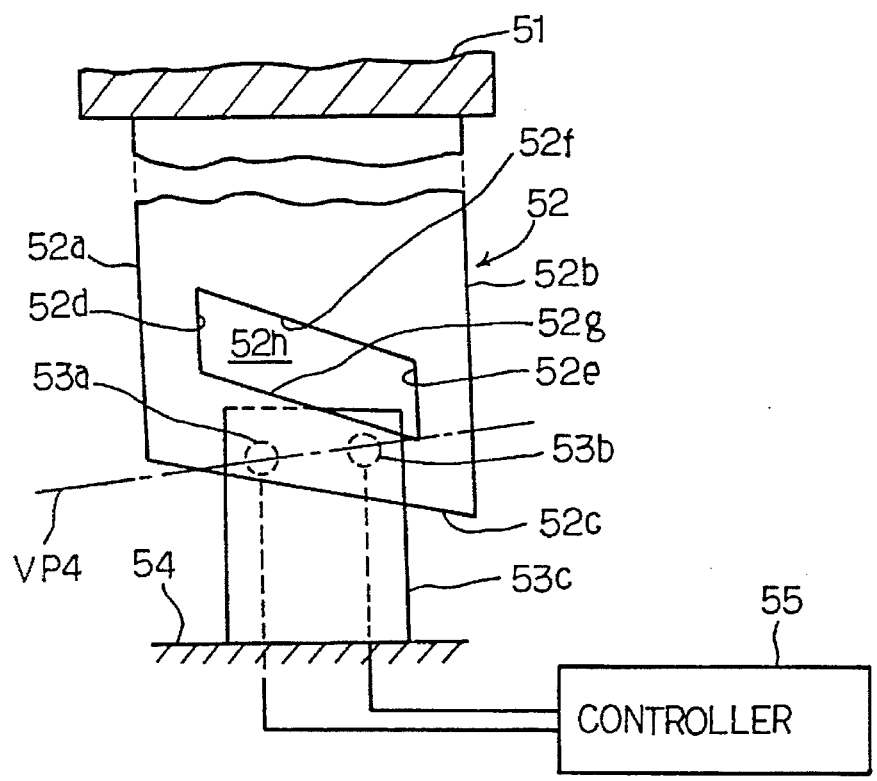
FIG. 17A and 17B are front views showing relative relation between a shutter plate and photo-interrupters of still another key sensor according to the present invention.

Turning to FIG. 17A of the drawings, still another key sensor embodying the present invention is provided for a key 51 forming a part of a keyboard, and the keyboard is incorporated in a keyboard musical instrument. The keyboard musical instrument may be an electronic keyboard system, an automatic player piano or the composite keyboard musical instrument.

The key sensor is implemented by the combination of a shutter plate 52 and a pair of photo-interrupters 53a and 53b. The shutter plate 52 is attached to a lower surface of the key 51, and is, accordingly, movable together therewith. The shutter plate 52 has outer side edges 52a and 52b in parallel to each other, an outer bottom edge 52c, inner side edges 52d and 52e in parallel to each other, an inner upper edge 52f and an inner bottom edge 52g oblique to a virtual plane VP4. The inner edges 52d, 52e, 52f and 52g define a window 52h in the shutter plate 52, and the outer bottom edge 52c is formed by a linear line. The distant between the inner bottom edge 52g and the virtual plane VP4 is varied from the left side to the right side according to the present invention.

On the other hand, the photo-interrupters 53a and 53b are accommodated in a case member 53c, and radiate light beams from the photo-emitting elements and the photo-detecting elements. The light beams are extending on the virtual plane VP4, and the shutter plate 52 can interrupt the light beams. The case member 53c is mounted on a stationary board member 54 such as, for example, a key bed, and the photo-interrupters 53a and 53b supply two-bit electric signal to a controller 55. The key 51 is moved toward the stationary board member 54, and is left therefrom. For this reason, the virtual plane VP4 and, accordingly, the photo-interrupters 53a and 53b are stationary with respect to the stationary board member 54, and the key 51 and the shutter plate 52 are movable with respect to the stationary board member 54.

Figure 17B:
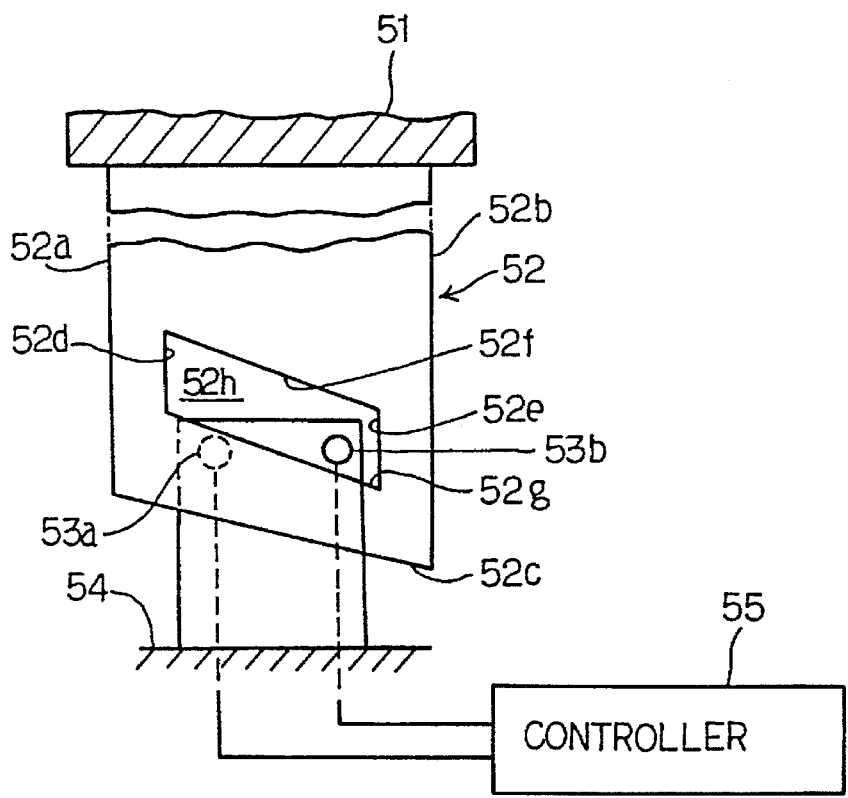

In operation, while the key 51 is staying in the rest position, the light beams of the photo-interrupters 53a and 53b are interrupted by the shutter plate 52 as shown in FIG. 17A, and the photo-interrupters 53a and 53b supply the two-bit electric signal indicative of the on-state. If the key 51 starts a downward motion, the photo-interrupter 53b is firstly exposed to the window 52h as shown in FIG. 17B, and changes the output to the high level indicative of the off-state. However, the other photo-interrupter 53a is still interrupted by the shutter plate 52, and maintains the output in the low level indicative of the on-state.

If the key 51 further advances the shutter plate 52, both photo-interrupters 53a and 53b are exposed to the window 52h, and the photo-interrupters supply the outputs of the high level indicative of the off-state.

If the shutter plate 52 is further moved downwardly, the photo-interrupter 53b is interrupted by the shutter plate 52, and the other photo-interrupter 53a is still exposed to the window 52h. As a result, the output of the photo-interrupter 53a is maintained in the high level indicative of the off-state, and the photo-interrupter 53b changes the output to the low level indicative of the on-state again.

When the key 51 reaches the end position, the shutter plate 51 interrupts the photo-interrupters 53a and 53b again, and the two-bit electric signal are in the low level indicative of the on-state.

While the key 41 is returning from the end position to the rest position, the two-bit electric signal changes the bit patter in the opposite direction to the downward motion.

In an assembling work for the keyboard instrument, even if the shutter plate 52 is offset from a standard position and, accordingly, the photo-interrupters 53a and 53b, the two-bit electric signal correctly changes the bit pattern, because the shared edge line 52g sequentially interrupts the light beams of the photo-interrupters 53a and 53b.

Fifth Embodiment

Figure 18:
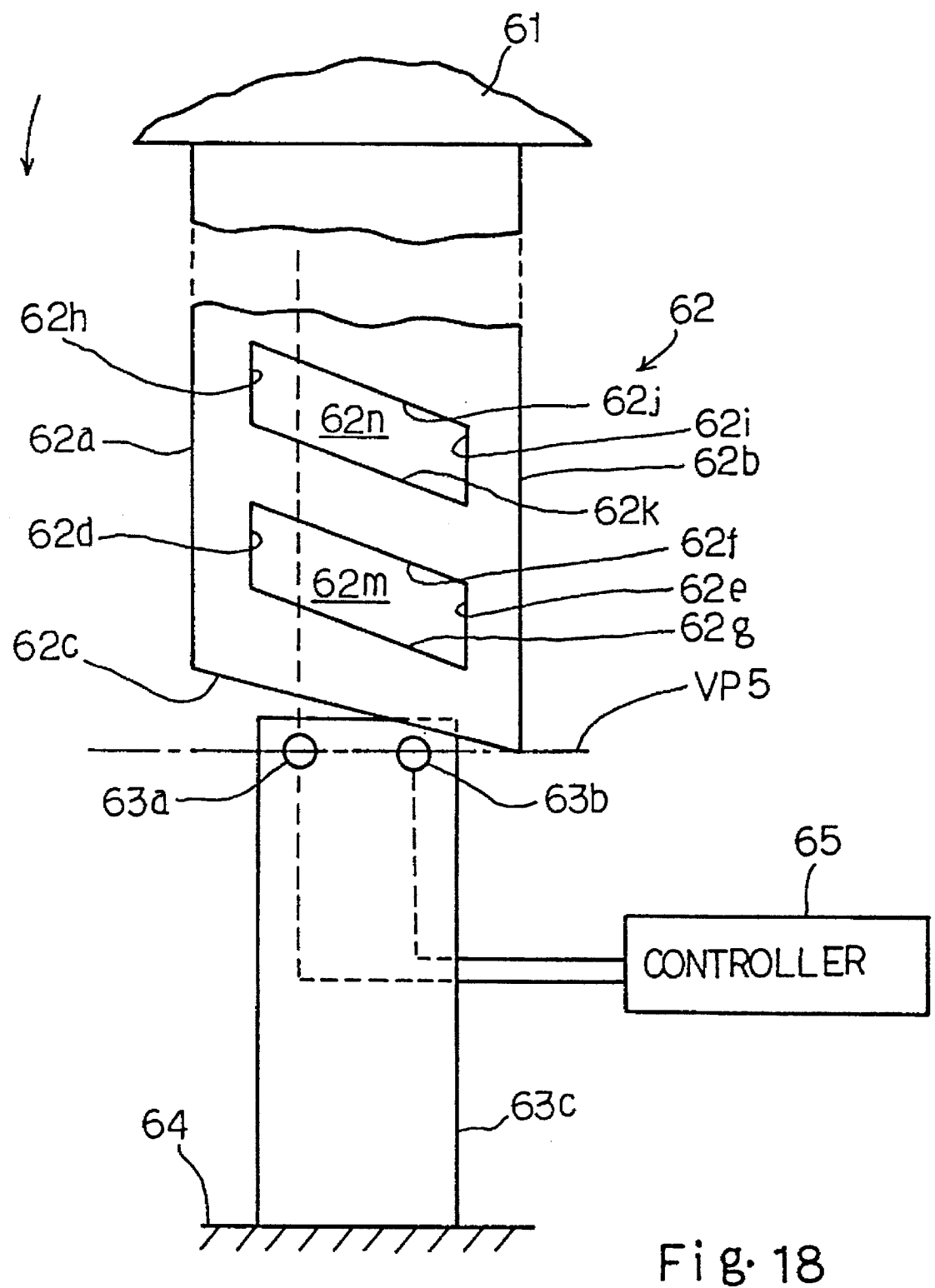
FIG. 18 is a front view showing another key sensor according to the present invention.

Turning to FIG. 18 of the drawings, another key sensor embodying the present invention is provided for a key 61 forming a part of a keyboard of a keyboard musical instrument.

The key sensor is implemented by the combination of a shutter plate 62 and a pair of photo-interrupters 63a and 63b. The shutter plate 62 is attached to a lower surface of the key 61, and is, accordingly, movable together therewith. The shutter plate 62 has outer side edges 62a and 62b in parallel to each other, an outer bottom edge 62c oblique to a virtual plane VP5, inner side edges 62d and 62e in parallel to each other, an inner upper edge 62f and an inner bottom edge 62g, other inner side edges 62h and 62i in parallel to each other, anther inner upper edge 62j and another inner bottom edge 62k. The inner edges 52d, 52e, 52f and 52g define a lower window 62m in the shutter plate 62, and the other inner edges 62h, 62i, 62j and 62k form an upper window 62n in the shutter plate 62. The outer bottom edge 62c is formed by a linear line, and the distant between the outer bottom edge 62c and the virtual plane VP5 is varied from the left side to the right side according to the present invention.

On the other hand, the photo-interrupters 63a and 63b are accommodated in a case member 63c, and radiate light beams from the photo-emitting elements and the photo-detecting elements. The light beams are extending on the virtual plane VP5, and the shutter plate 62 can interrupt the light beams. The case member 63c is mounted on a stationary board member 64 such as, for example, a key bed, and the photo-interrupters 63a and 63b supply two-bit electric signal to a controller 65. The key 61 is moved toward the stationary board member 64, and is left therefrom. For this reason, the virtual plane VP5 and, accordingly, the photo-interrupters 63a and 63b are stationary with respect to the stationary board member 64, and the key 61 and the shutter plate 62 are movable with respect to the stationary board member 64.

In operation, while the key 61 is staying in the rest position, the light beams of the photo-interrupters 63a and 63b are not interrupted by the shutter plate 62, and the photo-interrupters 63a and 63b supply the two-bit electric signal indicative of the off-state.

If the key 61 starts a downward motion, the photo-interrupter 63b is firstly interrupted by the shutter plate 62, and, thereafter, both photo-interrupters 63a and 63b are interrupted by the shutter plate 62. The photo-interrupter 63b is exposed to the lower window 62m, and both photo-interrupters 63a and 63b are exposed to the lower window 63m.

If the key 61 reaches the end position, the photo-interrupter 63b is firstly interrupted by the shutter plate 62, and, thereafter, both photo-interrupters 63a and 63b are interrupted by the shutter plate 62. Subsequently, the photo-interrupter 63b is exposed to the upper window 62n, and, thereafter, both photo-interrupter 63a and 63b are exposed to the upper window 62n.

Thus, the two-bit electric signal sequentially changes the bit pattern in the downward motion of the key 61. While the key 41 is returning from the end position to the rest position, the two-bit electric signal changes the bit patter in the opposite direction to the downward motion.

The key sensor implementing the fifth embodiment eight times changes the bit pattern, and can divide the locus of the key into eight sections. On the other hand, if the controller 65 makes the change of each output from the high-level to the low level or vice versa valid, the accuracy of time period therebetween is enhanced, because the photo-interrupters are not constant in the intensity of light beam, the diameter of light beam etc.

In an assembling work for the keyboard instrument, even if the shutter plate 62 is offset from a standard position and, accordingly, the photo-interrupters 63a and 63b, the two-bit electric signal correctly changes the bit pattern, because the shared edge lines 62c, 62g, 62f, 62k and 62j sequentially interrupt the light beams of the photo-interrupters 63a and 63b.

Sixth Embodiment

Figure 19:
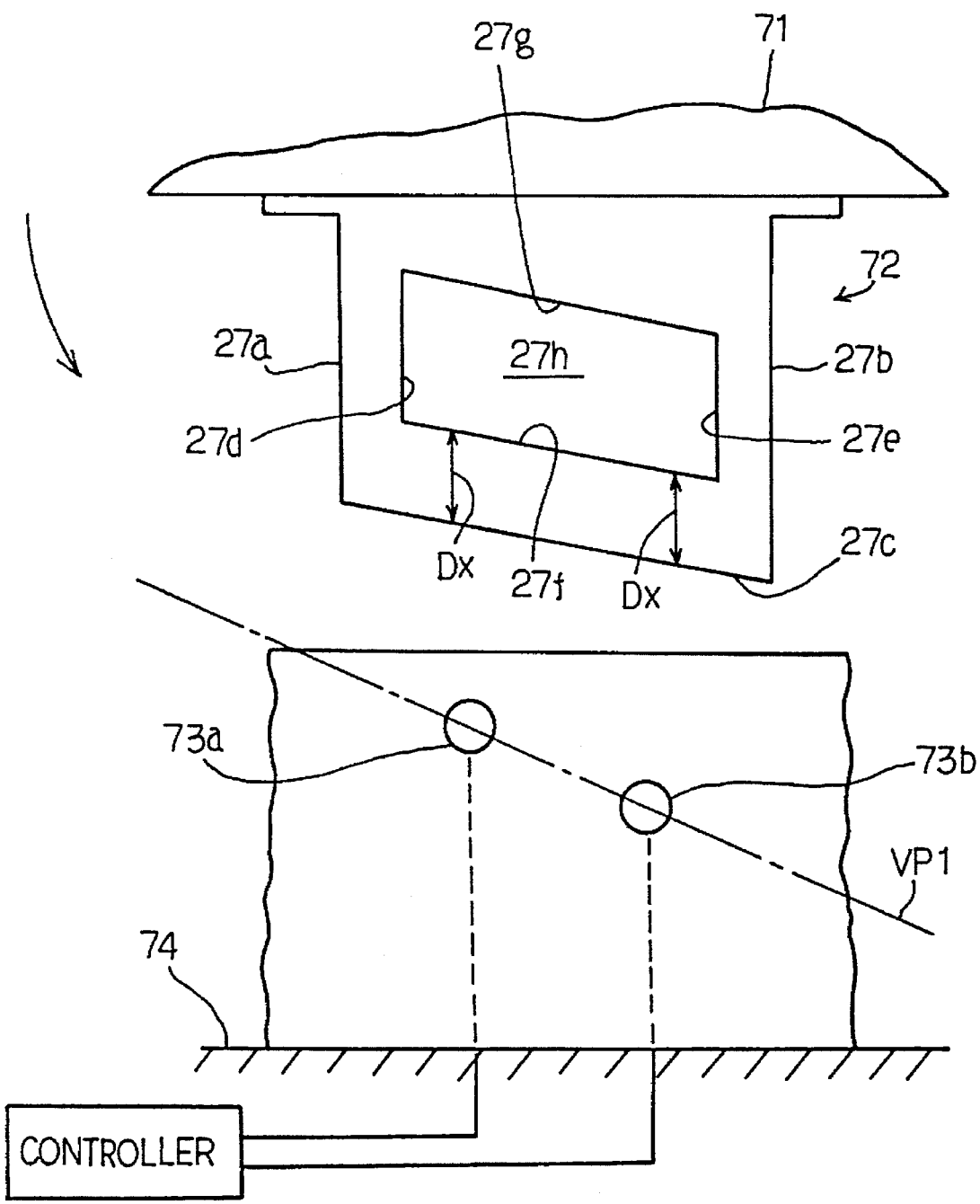
FIG. 19 is a front view showing yet another key sensor according to the present invention.

Turning to FIG. 19 of the drawings, yet another key sensor embodying the present invention is provided for a key 71. The key sensor is implemented by the combination of a shutter plate 72 attached to the key 71 and a pair of photo-interrupters 73a and 73b stationary with respect to a board member 74.

The key sensor implementing the sixth embodiment is similar to the first embodiment except for the inner bottom edge in parallel to the outer bottom edge, and the distance Dx' between the inner bottom edge and the outer bottom edge is constant. For this reason, the edges and the virtual plane are labeled with the same references used for the first embodiment without detailed description.

Even if the shutter plate 72 is offset from a standard position in the longitudinal direction of the key 71, each photo-interrupter 73a or 73b maintains the output to the low level for constant time period, because the distance Dx' at the photo-interrupter 73a or 73b is not changed.

Although particular embodiments of the present invention have been shown and described, it will be obvious to those skilled in the art that various changes and modifications may be made without departing from the spirit and scope of the present invention. For-example, the key sensors embodying the present invention has only two photo-interrupters. However, the key sensor according to the present invention does not limit to the two photo-interrupters. Another key sensor according to the present invention may have more than two photo-interrupters. Moreover, the controllers may have variable delay circuits for canceling the differences due to a mis-assembling work.

What is claimed is:

1. A key sensing device for use in a keyboard instrument in which a key is rotatable with respect to a board member from a rest position to an end position, said key sensing device comprising:

a plurality of photo-radiating elements and associated photo-electric converting elements, each photo-radiating element and associated photo-electric converting element forming an optical path therebetween and being stationary with respect to said board member, at least two of said optical paths being located on a virtual plane; and a shutter plate attached to said key, said shutter plate comprising a plurality of edges including at least one smooth, continuous edge that interrupts said at least two of said optical paths as said key rotates from said rest position to said end position, said at least one smooth, continuous edge varying in distance from said virtual plane so that said interruption of said at least two optical paths occurs sequentially.

2. The key sensing device as set forth in claim 1 wherein said at least one smooth, continuous edge defines a part of an outer peripheral configuration of said shutter plate.

3. The key sensing device as set forth in claim 2 wherein said virtual plane is in parallel to said board member.

4. The key sensing device as set forth in claim 2 wherein another of said plurality of edges is oblique to said virtual plane and defines a window in said shutter plate for allowing said at least two optical paths to intermittently pass therethrough, a distance between the edge defining said part of said outer peripheral configuration and said another of said plurality of edges being constant.

5. The key sensing device as set forth in claim 1 wherein said at least one smooth, continuous edge comprises a linear line.

6. The key sensing device as set forth in claim 1 wherein said at least one smooth, continuous edge comprises a non-linear curve.

7. The key sensing device as set forth in claim 6 wherein said non-linear curve defines a part of an outer peripheral configuration of said shutter plate, and other edges of said plurality of edges define a window in said shutter plate for allowing said at least two optical paths to intermittently pass therethrough.

8. The key sensing device as set forth in claim 1 wherein said at least one smooth, continuous edge defines a part of a window in said shutter for allowing said at least two optical paths to intermittently pass therethrough.

9. The key sensing device as set forth in claim 1 wherein a first set of said plurality of edges is oblique to said virtual plane and defines parts of a first window in said shutter plate for allowing said at least two optical paths to intermittently pass therethrough, and a second set of said plurality of edges is oblique to said virtual plane and defines parts of a second window in said shutter plate spaced from said first window for allowing said at least two optical paths to intermittently pass therethrough.

10. The key sensing device as set forth in claim 1 wherein said photo-radiating elements are respectively opposed to said photo-electric converting elements so that said optical paths directly extend therebetween.

11. The key sensing device as set forth in claim 1 further comprising:

a plurality of beam forming elements each coupled through an optical fiber to one of said photo-radiating elements; and a plurality of beam-receiving elements each coupled through an optical fiber to one of said photo-electric converting elements.

12. A key sensor incorporated in a keyboard musical instrument and associated with a key turntable between a rest position and an end position with respect to a board member, comprising:

a) a plurality of sets of photo-radiating elements and photo-electric converting elements stationary with respect to said board member, and having respective optical paths extending on a virtual plane between said photo-radiating elements and associated ones of said photo-electric converting elements; and b) a shutter plate attached to said key, and having a plurality of edges defining a configuration thereof, at least one of said plurality of edges being continuous and intermittently crossing said optical paths while said key is traveling from said rest position to said end position, said at least one of said plurality of edges varied in a distance from said virtual plane, wherein said at least one of said plurality of edges defines a part of an outer peripheral configuration of said shutter plate, another of said plurality of edges being oblique to said virtual plane and defining a window in said shutter plate for allowing said optical paths to intermittently pass therethrough, a distance between the at least one of said plurality of edges defining said part of said outer peripheral configuration and said another edge being varied for canceling a difference in radius of gyration of said key between points where said optical paths cross said edges.

13. A key sensor incorporated in a keyboard musical instrument and associated with a key turntable between a rest position and an end position with respect to a board member, comprising:

a) a plurality of sets of photo-radiating elements and photo-electric converting elements stationary with respect to said board member, and having respective optical paths extending on a virtual plane between said photo-radiating elements and associated ones of said photo-electric converting elements; and b) a shutter plate attached to said key, and having a plurality of edges defining a configuration thereof, at least one of said plurality of edges being continuous and intermittently crossing said optical paths while said key is traveling from said rest position to said end position, said at least one of said plurality of edges varied in a distance from said virtual plane, wherein said virtual plane is oblique to said board member, and said at least one of said plurality of edges defines one of a part of an outer peripheral configuration of said shutter plate or a part of a window for allowing said optical paths to pass therethrough.

14. A key sensor incorporated in a keyboard musical instrument and associated with a key turnable between a rest position and an end position with respect to a board member, comprising:

a) a plurality of sets of photo-radiating elements and photo-electric converting elements for producing light beams therebetween, and operative to output a multi-bit electric signal, said light beams extending on a virtual plane over said board member; and b) a shutter plate attached to a lower surface of said key, and having
an outer bottom edge forming a part of an outer configuration of said shutter plate and oblique to said virtual plane, and
an inner bottom edge forming a part of a window in said shutter plate,
said outer bottom edge and said inner bottom edge intermittently crossing said light beams for changing a bit pattern of said multi-bit electric signal when said key is moved from said rest position to said end position and from said end position to said rest position.

\* \* \* \* \*